Figure 3:
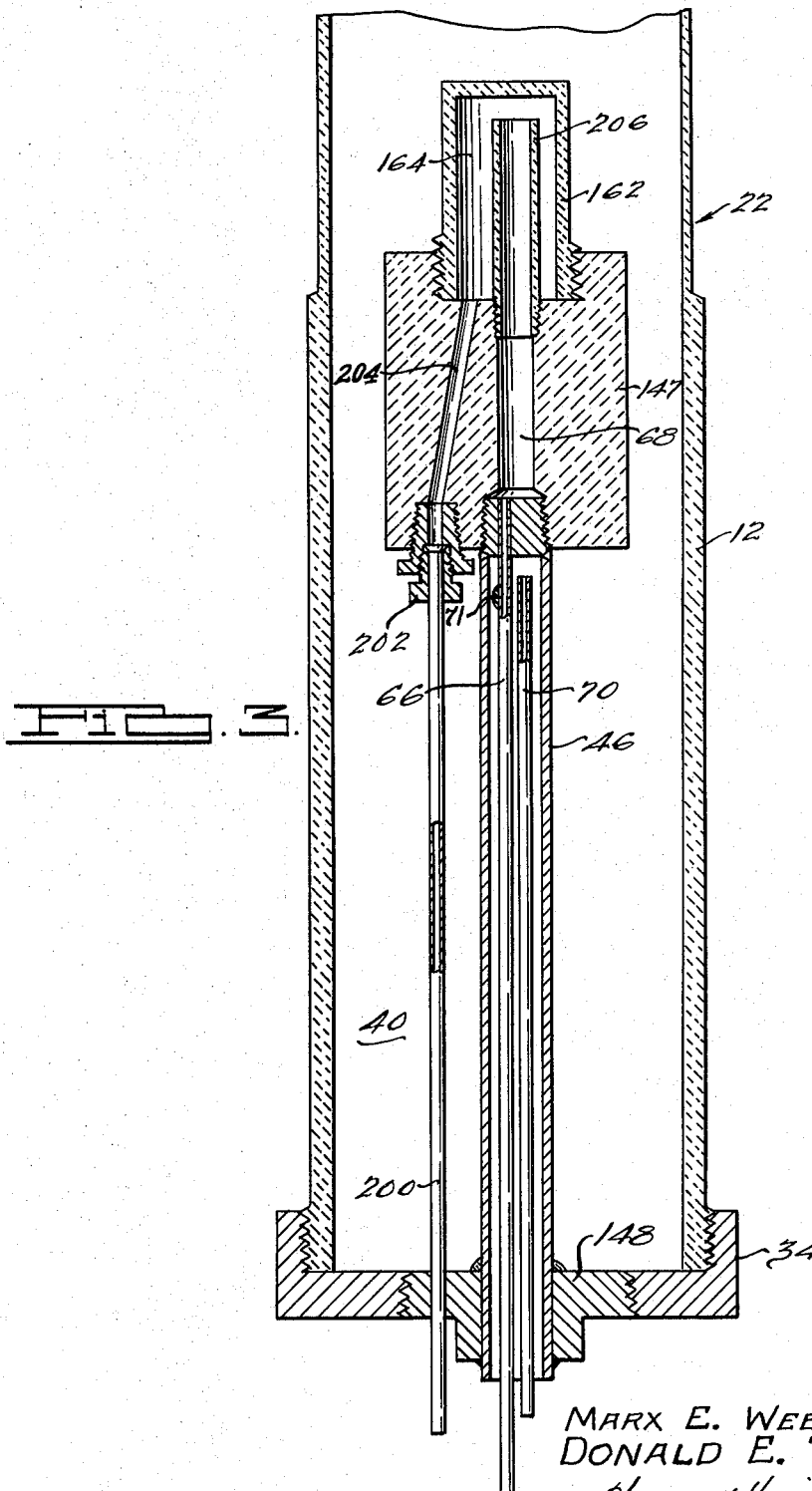

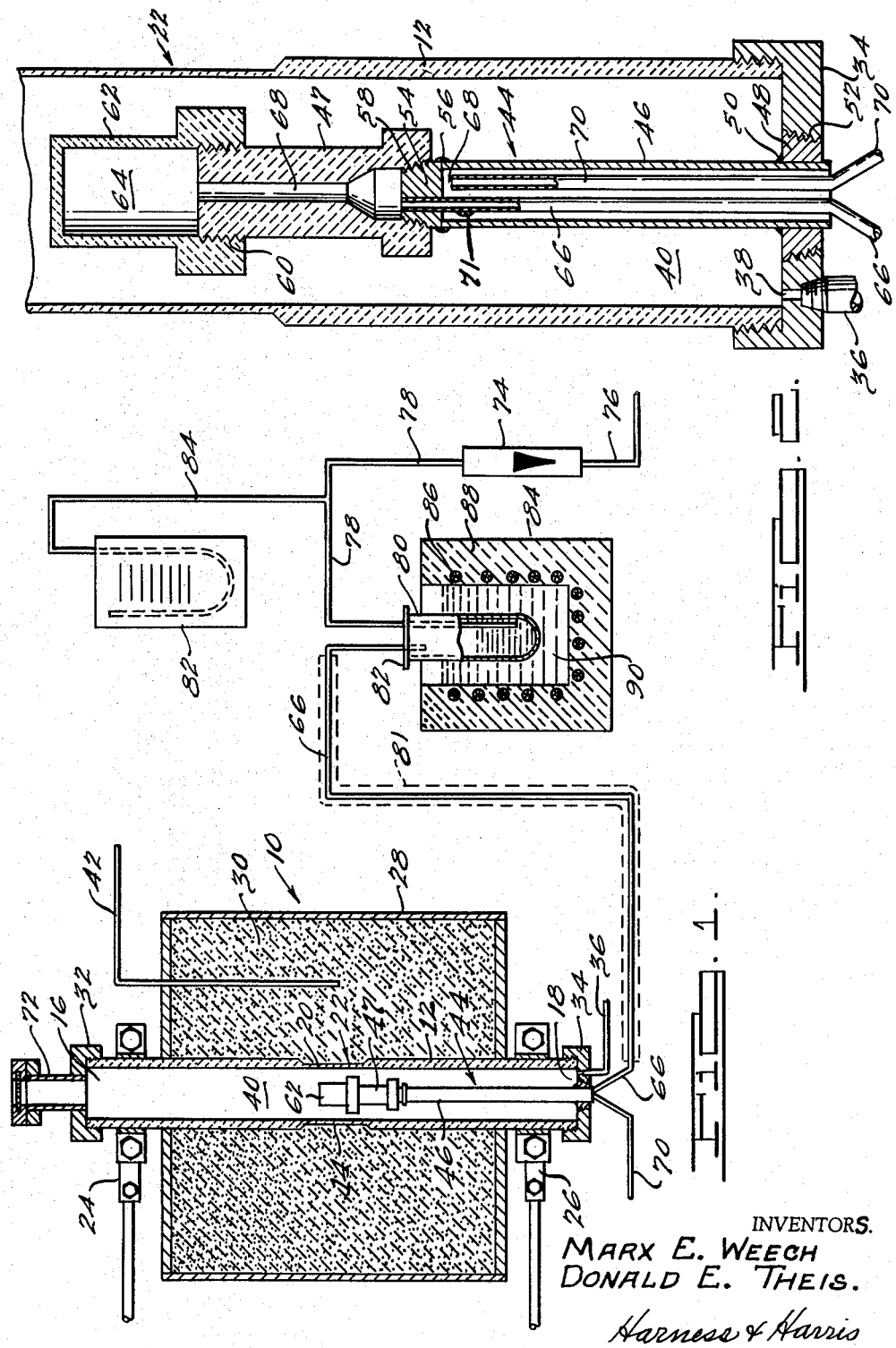

INVENTORS
MARX E. WEECH
DONALD E. THEIS.
BY Harness & Harris ATTORNEYS

3,244,141
APPARATUS FOR OBTAINING METAL CARBIDE COATING ON BASE MATERIALS

Marx E. Weech, Idaho Falls, Idaho, and Donald E. Theis, Ann Arbor, Mich., assignors to Chrysler Corporation, Highland Park, Mich., a corporation of Delaware
Original application July 9, 1958, Ser. No. 747,497, now Patent No. 3,151,852, dated Oct. 6, 1964. Divided and this application Aug. 28, 1961, Ser. No. 134,249
9 Claims. (Cl. 118—48)

This invention relates to apparatus for producing graphite and other allotropic materials and structures having thereon a metal carbide facing layer or coating. The present application is a division of our co-pending application Serial No. 747,497 filed July 9, 1958 now Patent No. 3,151,852.

The invention has particular reference to apparatus for producing diffusion barriers on graphite crucibles and other containers which are to be used for effecting the melting of other metals and for handling fluid fuels in high temperature nuclear reactors, for instance in uranium bismuth thermal reactor systems, whereby the container is provided with a metal carbide layer, coating or lining capable of reducing mass transfer and diffusion between such container structures and the molten metal or molten nuclear fuel.

The conversion of metals to the molten form where high purity is necessary, as in high temperature uranium bismuth thermal reactor systems requires a container material capable of withstanding high temperatures and which is preferably inert and resistant to diffusion and mass transfer.

Carbon in one of its allotropic forms, such as graphite, has been proposed as a structural material for handling such fuels and although it may possess the necessary thermal physical properties for such applications, chemical interactions result when the two materials are in contact with each other. Moreover, carbons react with many molten metals and would introduce impurities into the melt and the structure.

According to our invention it is proposed to eliminate the disadvantages of a carbon base material for the described applications while retaining its excellent high temperature properties, by treating the carbon base material as by coating, and/or chemical action to provide thereon a layer of a metal carbide which will be substantially complete in its coverage of the base material and which will preferably produce a metal carbide surfacing on the carbon stable to interaction with other molten metals for instance metals with carbide less stable than those of the surfacing.

Various techniques may be employed for obtaining this protective layer. For example, the carbon surface may be painted with a water slurry of finely ground metal to form the protective layer and then be heated until the metal reacts with the carbon base material to produce a metal carbide. However, this method is not uniformly effective to the production of uniform coatings where irregular shapes and surfaces are involved. Where as here, a substantially uniform layer resistant to diffusion and mass transfer is essential for best results we preferably treat the carbon base material with a mixture of a volatile halide of the metal (the carbide of which is to be formed) preferably the chloride of the metal, together with hydrogen, the carbon base being maintained at an elevated temperature sufficiently high for the following general reaction to take place:

$$M_xCl_y + xC + y/2 H_2 \rightarrow xMC + yHCl$$ at elevated temperatures where $M_xCl_y$ is a volatile metal halide in chemical purified form, C is the carbon of the surface to be treated, $H_2$ is hydrogen in chemically pure form and $x$ and $y$ are integers.

The use of a metal chloride is preferred from the standpoint of operating temperatures but the invention is not limited thereto. Other metal halides can be used. If metal fluorides are employed, higher reaction temperatures will be required. Similarly, bromides or iodides will require lower reaction temperatures. Proper control of the temperature in the heated and cooled sections of the apparatus to be described will make the use of fluorides, bromides and iodides feasible.

The metal carbide protective layer may also be obtained by direct deposition on the hot graphite or other suitable base materials of the reaction products of a volatile halide of a metal, hydrogen, and a hydrocarbon compound such as ethane ($CH_3CH_3$) and propane ($CH_3CH_2CH_3$), the temperature being sufficiently high to produce the reaction and to effect a bond of the metal carbide with the carbon base material.

It is to be observed that in the aforesaid procedures unless the gases are sufficiently pure to avoid the presence of water vapor and/or air the reaction contemplated may not occur and instead of obtaining a metal carbide, the water vapor and/or air will enter the reaction to produce metal oxides.

Moreover, the temperature at which the reaction is to take place is important. Uniform thin non-porous fine-grained smooth films over the carbon surface with fine finish are best obtained at practical rates in the temperature range 2500 to 3000° F. when the halide is used in the presence of reactive gas such as hydrogen. If the latter is not added to the halide, much higher temperatures must be employed to obtain a reaction. Reactions will then not occur much below 3900° F. Moreover, low temperatures are apt to produce non-uniform coatings and at temperatures above 3000° F., films with granular or crystalline irregularities occur.

An object of our invention is therefore to provide a base material especially of allotropic carbon form, such as graphite, with a protective layer and/or coating comprising a metal carbide.

Another object is to treat a heated base material with a vapor composition essentially comprising a volatile halide of a metal and reactive gas to produce thereon a metal carbide coating.

A further object of the invention is to provide direct chemical means of producing highly pure crystals of metal carbide formed in a finely divided particulate state by chemical reaction kinetic control of a solid-vapor phase reaction between a metal halide, a carbon particle or carbon carrying gas, and/or a hydrocarbon vapor.

A particular object is to provide a container for handling fluid metal reactor fuels which is made from carbon in one of its allotropic forms and the interior of which container is provided with a substantially uniform and complete metallic carbide layer coating sealing the pores thereof and which is highly resistant to chemical interaction and diffusion between it and the molten metal.

A further specific object is to provide an apparatus for producing a substantially hard, adherent and substantially uniformly thick layer or coating of a metal carbine over a base material for instance the interior surface of a graphite container or crucible to be used in a metal fuel thermal reactor system.

Other objects and advantages of our invention will be apparent from the following description and from the drawings illustrating without limitation our invention as applied to a graphite crucible for handling molten metal reactor fuels.

In the drawings:

FIGURE 1 is a schematic arrangement of the apparatus for carrying out the invention certain elements thereof being shown in section;

FIGURE 2 is an enlarged cross sectional view of the graphite crucible and vapor feeding apparatus for furnishing the volatile composition to produce a metal carbide coating on the interior of the crucible; and FIGURE 3 is a modification of the apparatus of FIGURES 1 and 2 having application for coating other materials besides carbon substances such as graphite and wherein means are provided for controlling the pressure within the crucible and for withdrawing unreacted gases.

In the drawings wherein similar numerals have reference to similar parts of the structure, the numeral 10, generally refers to an electrically heated resistance furnace comprising a central tubular resistance element 12, such as a cylindrical graphite pipe which has a central longitudinal portion 14 between its ends 16, 18 formed, as by turning, with wall 20 of reduced thickness to provide a high electrical resistance zone generally designated by the numeral 22. Suitable clamp type leads 24, 26 connect the element 12 to a conventional source of electrical power.

The element 12 is securely mounted in a container 28 filled with a suitable high temperature insulation material 30 such as carbon black powder. The tubular element 12 is closed at its ends by suitable cup-shaped metallic caps 32, 34 threadedly secured to the element 12 in a manner to produce a substantial air-tight connection that will prevent the entrance of air during heating of the furnace.

A tube or pipe 36 is threadedly connected to the cap 34 and connects with passage 38 (see FIGURE 2) that opens into the interior space 40 of the element 12. This tube serves as a means of exhausting the gaseous reaction products that diffuse through the walls of crucible 64 and may also be used for purging space 40 prior to a run. Similarly, a tube or pipe 42 extends through the casing 28 and opens into the body of insulation material 30 to facilitate feed thereto from a source not shown of an inert gas such as nitrogen ($N_2$) for purging this space and material of air and prevent combustion.

Extending into the element 12, as best seen in FIGURE 2, is a tubular vapor feed structure generally designated by the numeral 44 and which may preferably comprise a metallic feed tube 46, preferably of stainless steel, and a suitable connector and article carrying member 47 of graphite. A stopper-like element 48 preferably surrounds the tube 46 adjacent its lower end and is connected as by a weld 50 thereto. This element 48 serves to support the feed mechanism 44 and securely mounts the same on the lower cap 34 as by a threaded gas-tight pipe connection 52. The tube 46 is provided at its upper end with a suitable closing end plug or cap 54 connected thereto as by a weld 56. This plug 54 extends into and threadedly connects as at 58 with the graphite connector 47 with which it forms an air-tight joint and support. The upper end of the graphite connector 47 is suitably threaded, as by an external thread 60 by which it may receive and support an article, such as an inverted graphite cup-like crucible 62, the surface of whose interior 64 is to be treated in accordance with our invention. The open end of the crucible is provided with a mating thread to fit the thread 60. It will be observed that the length of the feed mechanism 44 is such that the crucible is positioned in the hot zone 22 of the furnace.

In order to bring the treating vapor to the crucible interior 64, suitable means such as a tube or pipe 66 extends through the tube 46 and cap 54 and opens into an axial passage 68 which extends through the graphite connector 47 and opens into the interior space 64 of the crucible. The tube 66 is securely mounted in the cap 54.

The vapor feed tube 66 is preferably treated over its major length in the furnace 10 by a suitable heat exchange medium to prevent overheating of the element 46 surrounding the vapor feed tube 66 before it reaches the hot zone of the furnace and to avoid condensing of the vapor in the feed stream which would reduce the rate of carbide formation. For this purpose we preferably may employ a suitable liquid coolant such as water which may be brought to the interior space 68 of the element 46 surrounding the vapor feed tube 66 by a tube or pipe 70 which opens into this space adjacent the upper end of the element 46, and may drain from the lower end thereof into a suitable basin or the like, not shown. Preferably this cooling water is recirculated through the tube 46 by a small centrifugal pump (not shown). As the water is recirculated, it becomes heated and maintains the desired temperature level of the feed. Cold water is admitted as needed to the system in controlled amounts and the excess removed by the drain system to maintain these temperatures. For a furnace temperature of 2800° F. a temperature of 300° F. at the upper end of the tube 46 has been found satisfactory. A thermocouple 71 may be welded to the tube 66 adjacent the upper end thereof for obtaining temperature readings and the lead wires therefor (not shown) be brought out of the outlet of tube 46.

The upper cap 32 of the resistance element 12 is preferably provided with a sight glass generally designated by the numeral 72 and which forms a gas-tight connection with the cap. The glass 72 provides a means for measuring by suitable pyrometric apparatus, the temperature of the crucible.

The means we provide for forming the feed material or treating vapor preferably comprises a conventional flow meter 74 connected by pipe 76 to a source (not shown) of purified reactive gas capable of combining with the halide of the metal halide, preferably purified hydrogen ($H_2$). A discharge pipe 78 conducts the hydrogen from the flow meter to a suitably closed and heated vessel 80 containing the liquid metal halide and having a stopper or cone 82 through the which the pipe 78 extends to adjacent the bottom of the container and below the level of the liquid metal halide whereby the hydrogen can bubble through the metal halide. Preferably a silica gel drying tube is provided in the line 78 ahead of the vessel 80 to remove any water vapor from the hydrogen.

The vessel 80 may be heated in any suitable manner but is preferably heated in an open electrical heating container 84 comprising a plurality of heating coils 86 wound within the insulated walls 88 of the container and connected to a source of power and controls, not shown. Suitable means (not shown) are provided for supporting the vessel 80 in the body of heating oil 90 which fills the space in the annulus between the vessel 80 and the container wall 88. By proper operation of the power controls the temperature in the vessel 80 may be suitably regulated to maintain a vapor pressure of the metal halides sufficiently high that the desired ratio of hydrogen to metal halide will be obtained.

The metal halide vapor is conducted from the vessel 80 to the crucible 62 by the previously described pipe line 66, which connects with the vessel 80 through the stopper 82 and opens into the vessel adjacent the top thereof. The line 66 between the vessel 80 and the furnace 10 is preferably heated by suitable means for instance an electric coil (not shown) embedded in a wall 81 (shown in phantom in FIGURE 1) surrounding the pipe 66. Pipe 66 is heated sufficiently to prevent condensation of the metal halides on this tube and the temperature of the remainder of this line 66 in the feed tube 46 is controlled in the manner previously described to prevent condensation and formation of non-voltaile lower metal halides therein for instance the formation of $MCl_3$ and $MCl_2$ where the halide is a tetrachloride of a metal to be obtained. In the latter case where water is the coolant a temperature of about 200° F. will be found satisfactory.

Some indication of the action occurring in the crucible is evident from the pressure therein and in the feed system. To record the pressure drop through the feed lines and the graphite crucible in the furnace we provide a manometer 82 which connects by a pipe or tube 84 with the hydrogen intake line 78 of the vessel 80. During initial stages of a run the graphite crucible 62 is porous and the gaseous products of the reaction as well as the excess hydrogen readily diffuses through the crucible wall so that the internal pressure will then be relatively low about two inches of mercury on the manometer. However, as the carbide layer begins to form the graphite pores become filled with metal carbide and the pressure in the system increases and may run as high as forty inches of mercury on the manometer during a run.

In coating graphite crucibles of the character described we preferably employ as feed materials volatile chlorides of metals such as titanium and zirconium that will produce hard, stable coatings all adherent to the graphite or other carbon base and that have high melting points.

In typical operations employing these feed materials the vessel 80 is provided with either titanium chloride ($TiCl_4$) or zirconium chloride ($ZrCl_4$) and the crucible 62 is screwed into place on the connector 47. The furnace 10 is then preferably brought up to a temperature between 2700 to 3000° F. which is optimum for these chlorides. Hydrogen is fed to the vessel 80 from the flow meter 74 and the vessel 80 is heated through the oil 90 by the electric coil 86 until it is sufficiently heated to effect a vapor pressure to produce a hydrogen to metal chloride ratio of about 2½ to 3 moles of hydrogen ($H_2$) per mole of the metal chloride. This will occur at about 45° C. As the hydrogen percolates through the metal chloride and enters the tube 66 it carries with it some of the metal chloride vapor ($TiCl_4$) or ($ZCl_4$) which then flows to the crucible 62 through the tube 66 and connector passage 68 where, upon coming into contact with the heated graphite a reaction takes place as follows between the metal chloride-hydrogen mixture and the graphite.

(1) $$TiCl_4 + C + 2H_2 \xrightarrow{\Delta} TiC + 4HCl$$

(2) $$ZrCl_4 + C + 2H_2 \xrightarrow{\Delta} ZrC + 4HCl$$

and a metal carbide coating or layer is formed on the graphite which X-ray examination indicates to be TiC or ZrC as the case may be. The carbide layer is hard, very adherent to the graphite, impervious and substantially uniform in thickness. During these operations the section of the feed tube 66 between the vessel 80 and the reaction furnace 10 is heated to prevent condensation of the $TiCl_4$ or $ZrCl_4$ and the portion of feed tube 66 within the furnace is brought into heat exchange relationship with a liquid coolant such as water at 200° F. to prevent the formation of lower chlorides such as $TiCl_3$, $TiCl_2$ and $ZrCl_3$, $ZrCl_2$.

When using the above metal chlorides and hydrogen, operating temperatures below about 2700° F. will usually give non-uniform coatings, and operating temperatures much above about 3000° F. will produce a coarse grained porous coating layer. It has also been observed that the use of coarse graphite in the structure of the crucible produces a heavier coating.

While we have described an operation above employing either $TiCl_4$ or $ZrCl_4$ it will be understood that the crucible or other carbon container or surface may be similarly coated with other metal carbides to obtain other surface properties using other metal halides as the feed material in mixture with hydrogen ($H_2$). To accomplish this, however, the metal halide must have a degree of volatility at reasonable working temperatures; a criteria which would fit the halides of many metals, other than those of the alkali and alkali earth metals. Moreover, the furnace must be maintained at a temperature sufficiently high for the necessary reaction to take place.

The following are examples of other metal halides and their reactions with carbon under the stated conditions; the ratios of $H_2$ to feed material being shown in the reactions:

(1) $$3CrCl_3 + \frac{9H_2}{2} + 2C \longrightarrow Cr_3C_2 + 9HCl$$

(2) $$HfCl_4 + 2H_2 + C \longrightarrow HfC + 4HCl$$

(3) $$2MoCl_6 + 6H_2 + C \longrightarrow Mo_2C + 12HCl$$

(4) $$NbCl_5 + \frac{5H_2}{2} + C \longrightarrow NbC + 5HCl$$

(5) $$TaCl_5 + \frac{5H_2}{2} + C \longrightarrow TaC + 5HCl$$

(6) $$VCl_5 + \frac{5H_2}{2} + C \longrightarrow VC + 5HCl$$

(7) $$WCl_6 + 3H_2 + C \longrightarrow WC + 6HCl$$

(8) $$UCl_6 + 3H_2 + 2C \longrightarrow UC_2 + 6HCl$$

(9) $$ThCl_4 + 2H_2 + ZC \longrightarrow ThC + 5HCl$$

It will be understood that in some instances the feed material may in the processing be reduced to a lower valence state before the carbide formation occurs. By means of the coolant feed through the pipe 70 adjacent the reaction zone attempt is made to control and prevent the formation of lower chlorides that are substantially non-volatile.

It has been found desirable in certain cases to provide a process and apparatus which avoids the pressure build-up previously described with respect to the construction shown in FIGURES 1 and 2 which has served as a measure of the completeness of the metal carbide coating layer formed in the crucible, and to instead vent the reaction vapors from the reaction zone 64 of the crucible.

The changes necessary to make this transition are shown in FIGURE 3 which is an enlargement similar to that in FIGURE 2 of the feed mechanism adjacent the reaction zone. The apparatus is otherwise the same as in FIGURES 1 and 2.

As seen in FIGURE 3, the feed support tube 46 is centrally mounted in a base plug 148 secured coaxially in the lower cap 34.

Radially offset from the tube 46 on base plug 148 is an elongated vent tube 200, the upper end of which connects through a pipe fitting 202 with an oblique passage 204 in the connector block 147, the passage 204 opening into the interior or reaction zone 164 of the crucible 162. The lower end of the tube 200 opens into the atmosphere or a suitable vapor collecting source not shown.

Connector block 147 also carries a charge diffusing graphite tube 206 which is threadedly secured to the block at the upper end of feed passage 68 and extends upwardly in the crucible 162 to adjacent the upper end of the crucible.

By means of the structure in FIGURE 3, when metal halide vapor is conducted through feed tube 66 and passage 68 to the crucible as described above, the tube 206 which serves as extension of passage 68 assuring diffusion of the vapor to all parts of the crucible interior where it reacts with the carbon surface to produce a metal carbide and forming hydrogen chloride (HCl) which latter together with unreactive gases are purged from the crucible by the vapor outlet tube 200. The extension tube 206 also acts to prevent vent of the halide from the crucible before it can react with the carbon surfacing.

While we have described above a process and apparatus whereby a metal halide vapor is brought into reaction with a carbon surfacing to produce a metal carbide layer, the metal carbide may by procedure independent of the nature of the surface upon which the metal carbide coating is desired and employing the arrangement in FIGURE 3, be directly deposited on the surface to be treated, for example graphite, in the reaction zone of the crucible. This is possible by employing a vapor feed stream that contains the necessary carbon for carbide formation. As an example of this method a feed gas such as ethane ($CH_3CH_3$) or propane ($CH_3CH_2CH_3$) of proper purity alone or admixed with hydrogen (H₂) would be fed through the flow meter or through separate flow meters to the flask 80 where it is saturated with a metal halide vapor such as a metal chloride and this mixture then fed into the high temperature zone 164 through the previously described feed lines 66, 68, and 206. There under the high heat concentration the hydrocarbon and metal chloride feed vapors break down to furnish the carbon for metal carbide formation and hyrogen for reaction with the chloride to form hydrogen chloride. Free hydrogen is provided in addition to the other feed gases when an excess of halide is expected for combination therewith.

As previously stated, this method and apparatus is independent of the nature of the surface to be coated and hence it may readily be employed for coating other materials besides carbon with a carbide layer. In the latter case the base material must of course be capable of sustaining the required temperatures.

Metal carbide coatings or layers on graphite obtained by either described process effect excellent bonds therewith. Temperature cycling between 2400° F. and 80° F. does not adversely effect the bond. Coatings of 5 mils or thicker provide exceptional barriers. For instance, TiC and ZrC are stable in the presence of molten uranium up to temperatures of about 2400° F.

Discrete carbide crystal formation rather than coatings are obtainable when operating temperatures above 3000° F. are employed by reason of rapid carbon migration at such high temperatures rather than an even coating formation. Such crystal formation will be more pronounced when the feed gases are hydrocarbons and makes possible the formation of granular carbides.

We claim:

1. Apparatus for producing metal carbide coatings on base structures comprising an electrically heated resistance furnace including a tubular carbon resistance element having a high electrical resistance zone, closure means at the opposite ends of said tubular element forming a closed heating chamber within said element, a vapor feed structure supported by one of said closure means and extending into said heating chamber adjacent said zone, means forming a coating chamber connected with said vapor feed structure, said feed structure includuing a conduit, one end of which opens into said coating chamber, a source of metal halide vapor connecting with the other end of said conduit and means for controlling the temperature of said metal halide vapor in said conduit.

2. Apparatus for producing metal carbide coatings on base structures comprising an electrically heated resistance furnace including a tubular carbon resistance element having a high electrical resistance zone, closure means at the opposite ends of said tubular elements forming a closed heating chamber within said element, a vapor feed structure supported by one of said closure means and extending into said hearing chamber adjacent said zone, means forming a coating chamber connected with said vapor feed structure, said feed structure including a conduit, one end of which opens into said coating chamber, a container for holding a liquid metal halide connecting with said conduit for delivering a vapor thereof thereto, means for heating said container and means for controlling the vapor pressure of said vapor.

3. Apparatus for producing metal carbide coatings on base structures comprising an electrically heated resistance furnace including a tubular carbon resistance element having a high electrical resistance zone, closure means at the opposite ends of said tubular element forming a closed heating chamber within said element, a vapor feed structure supported by one of said closure means and extending into said heating chamber adjacent said zone, means forming a coating chamber connected with said vapor feed structure, said feed structure including a conduit, one end of which opens into said coating chamber, a container for holding a liquid metal halide connecting with the other end of said conduit, means for heating said container for effecting delivery of a vapor of said halide to said conduit, means for heating a portion of said conduit adjacent said container and means for cooling a portion of said conduit adjacent said coating chamber.

4. Apparatus for producing metal carbide coatings on base structures comprising an electrically heated resistance furnace including a tubular carbon resistance element having a high electrical resistance zone, closure means at the opposite ends of said tubular element forming a closed heating chamber within said element, a vapor feed structure supported by one of said closure means and extending into said heating chamber adjacent said zone, means forming a coating chamber connected with said vapor feed structure, said feed structure including a conduit, one end of which opens into said coating chamber, a container for holding a liquid metal halide connecting with said conduit, means for heating said container for effecting delivery of a vapor of said halide to said conduit, and means in heat exchange relationship with said conduit for controlling the vapor pressure in said conduit.

5. Apparatus as claimed in claim 1 including means for conducting an inert gas to the chamber formed by said tubular resistance element.

6. Apparatus as claimed in claim 1 including a sight glass in the other of said closure means of said electrical resistance element.

7. Apparatus as claimed in claim 1 wherein said vapor feed structure includes a second conduit opening into said coating chamber and means for connecting said conduit to atmosphere.

8. Apparatus for producing a metal carbide surfacing on a base structure comprising an electrically heated resistance furnace including a central tubular carbon resistance element provided with a high electrical resistance zone, stopper means at opposite ends of said tubular element forming a closed chamber therein, a vapor feed structure carried by one of said stopper means and extending into said chamber adjacent said zone, means including the base structure to be coated connected with said vapor feed means and forming a closed chamber therewith, said vapor feed means including a passage, one end of which opens into said base structure chamber, a container providing a reservoir for a metal halide, means providing a source of hydrogen gas, means for conducting hydrogen gas from said source to said container, means for heating said container for controlling the vapor pressure within said container, and conduit means for conducting a halide hydrogen mixture from said container to the other end of said passage of said vapor feed structure.

9. Apparatus as claimed in claim 2, including means providing a source of gas for reacting with the liquid metal halide in said container, and means for conducting said gas to said container.

References Cited by the Examiner

UNITED STATES PATENTS

| | | | |
|---|---|---|---|
| 1,422,135 | 7/1922 | Rogatz | 23—208 |
| 1,434,451 | 11/1922 | Reid | 23—208 |
| 2,621,625 | 12/1952 | Brown | 118—49 |
| 2,810,664 | 11/1957 | Gentner | 117—47 X |
| 2,853,970 | 9/1958 | Novak | 118—49 |
| 2,978,358 | 4/1961 | Campbell | 117—106 X |
| 3,042,493 | 7/1962 | Reuschel et al. | |

MORRIS KAPLAN, *Primary Examiner.*

RICHARD D. NEVIUS, M. KATZ, G. L. WELLS,
*Assistant Examiners.*